April 27, 1965     H. E. FLORA ETAL     3,180,804
NUCLEAR FUEL PIN END CLOSURE
Filed Oct. 3, 1961
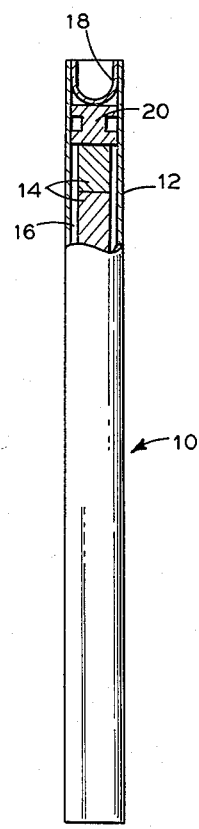
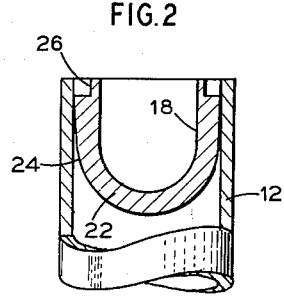
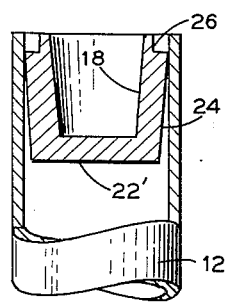
INVENTORS
Herbert E. Flora
George K. Shield
BY
ATTORNEY

3,180,804
NUCLEAR FUEL PIN END CLOSURE
Herbert E. Flora and George K. Shield, both of Lynchburg, Va., assignors to The Babcock & Wilcox Company, New York, N.Y., a corporation of New Jersey
Filed Oct. 3, 1961, Ser. No. 142,646
5 Claims. (Cl. 176—79)

This invention relates to an end closure plug for a nuclear fuel pin and more specifically to a cup-shaped closure adapted to be welded in the end of a thin walled tube.

Nuclear fuel pins are used to form the core, or reactive part, of a nuclear reactor, being desposed in a closely spaced array so as to achieve the critical mass and form necessary to maintain a self-sustaining fission-type chain reaction. Such fuel pins are generally formed of small diameter, thin walled tubes into which pellets or powder, containing a fissionable material, such as uranium, are sealed by the insertion of an end plug or closure into the end of the tube then forming a seal weld between the end of the tube and the end closure. Due to the fact that these welds are subjected to wide ranges of pressure and temperature gradients, not withstanding which they must prevent leakage of fission product gases formed when the fissionable material in the tubes undergoes the fission reaction in the reactor, it is seen that the end closures and the seal welds must be of the utmost integrity with a minimal possibility of failure since leakage of the gases would contaminate the reactor system.

When it is realized that a typical nuclear reactor may have upwards of 20,000 individual fuel pins, requiring a closure at both ends, with upwards of 40,000 welded joints to be made, is is apparent that the end closure must be made with the utmost guarantee of closure seal integrity. Such a demand is complicated by the fact that it is almost impossible to test the completed sealed end, with any degree of certainty, by any presently available non-destructive test method. Thus the integrity of the closure seal must be inherent in the closure and cannot be made to depend upon subsequent testing.

Additional problems arise when, as in several reactors now built or being built, the fuel pin tubing is stainless steel with a 0.03 to 0.05 percent boron content which is used as a burnable poison in the reactor core. The type of material has a great susceptibility to cracking during welding, thereby reducing the probability of an acceptable weld.

The end closures presently used are generally cylindrical in shape, being either solid or cup-shaped, and have an outside diameter very slightly larger than the inside diameter of the fuel pin tubes to be sealed so that upon insertion the end closure will form a tight fit therein. These end closure plugs are forced into the ends of the tubes until the end of the closure coincides with the end of the tube. A weld is then made at the circular joint between the end plug and the tube. Because of the large number of welds to be made, as noted above, they are preferably made on an automatic welding machine. However, experience has shown that the resulting welds have not been of the uniformly high quality necessary to insure satisfactory operation within a nuclear reactor.

Thus it is the purpose of the present invention to provide an end closure for a fuel pin which provides a welded, sealed closure that is inherently safe and which does not depend upon extensive production testing to guarantee the closure integrity.

Accordingly, the present invention provides, in a fuel pin comprising an elongated tube containing fissionable fuel material, an end closure for sealingly closing the end of the tube, the end closure comprising a circular cup-shaped tapered member having an inner end of smaller diameter than the outer end to provide an inwardly tapering substantially cylindrical outer surface of extended length, said extended cylindrical outer surface being coextensive with the inner surface of the end of the tube, and means providing a welding groove at the juncture of the end of the tube and the outer end of the cup-shaped member.

The cup-shaped member may have an outer end of such diameter as to permit a force or push fit within the end of the fuel pin tube. Also, the outer end of the cup-shaped member may have a peripheral groove formed therein which cooperates with the inner surface of the tube end to form the above-mentioned welding groove.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described preferred embodiments of the invention.

Of the drawings:
FIG. 1 is a view, partly in section, of a fuel pin;
FIG. 2 is an enlarged sectional view of an end closure of the present invention; and
FIG. 3 is an alternate type of end closure.

A fuel pin 10, partly in section is illustrated in FIG. 1 and comprises an elongated tube 12 containing a plurality of pellets 14 of fissionable fuel material. These fuel pellets occupy substantially all the space within the fuel tube having a small volume 16 left between the pellets and the inner wall of the tube to accommodate differential thermal expansion between the pellets and the tube. This volume 16 is usually filled with a heat transfer medium, such as helium, in order to promote heat transfer between the fuel pellets and the tube wall.

Each end of the tube 12 is sealed by an end closure plug 18 which will be more fully described hereinbelow. An insulating spacer 20 is placed at each end of the fuel pellet column and serves to reduce the temperature gradient between the tube and the end fuel pellet, thereby reducing the stresses caused by differential thermal expansion.

An enlarged sectional view of the closure plug 18 in place within the end of the tube 12 is shown in FIG. 2. The closure plug may be described as a circular cup-shaped, tapered member inserted closed end first into the end of a tube. The closure plug is substantially circular in shape having an outer diameter only slightly larger than the inner diameter of the tube it is to seal. Thus, the closure plug is a force fit within the end of the tube so as to provide a mechanical joint as well as the welded joint, which will be described later. The closure plug has a generally cylindrical outer surface with a hemispherical closed end 22 which is inserted into the end of the tube with the open end of the closure plug corresponding with the end of the tube. The inner closed end 22 of the closure plug has a smaller outer diameter than the outer open end portion thereby providing an inwardly tapering outer surface 24. It is this tapered outer surface which permits the closure plug to be inserted into the end of the tube without deforming the end of the tube as will be further described hereinbelow.

A peripheral welding groove 26 is provided in the outer end of the closure plug which in combination with the end of the tube provides for the repository for the weld metal of the seal weld (not shown).

An alternate arrangement of the end closure plug 18 is shown in FIG. 3. This arrangement is similar to the preferred embodiment previously described except that the closed inner end 22′ has a flat circular section rather than a hemispherical shape. Otherwise similar parts have the same reference numbers as in FIG. 2.

It has been found that a force fit closure plug in the end of a fuel pin tube causes the thin walled tube to yield non-uniformly, resulting in high eccentricity of the tube, thus making it difficult to maintain a uniform welding arc when using an automatic welding machine, and as a consequence producing a weld having non-uniform cross-section and penetration. The use of a gradual taper on the outer surface of the closure plug permits the tube wall to yield more gradually and hence more uniformly. Thus, out-of-roundness or elliptical deformation of the tube is prevented, making it possible for an automatic welding machine to accurately track the joint line with the requisite arc stability and uniform weld penetration.

The welding groove aids in the production of a satisfactory weld by providing a definite channel for the weld metal and the welding arc to follow, adding to arc stability. Further, the welding groove provides for more uniform heat distribution at the root of the weld, providing uniform weld penetration with uniform cooling of the weld root. It is this uniform cooling which helps eliminate weld-root cracking by minimizing the thermal stresses set up during the welding process.

A specific example of a fuel pin and the end closure used therein is as follows: The fuel pin is fabricated from a type 304 stainless steel tube having an outside diameter of 0.304 inch and a wall thickness of 0.020 inch. The closure plug is formed of type 308 stainless steel with an outer diameter at the outer end of 0.266 inch with a wall thickness of 0.021 inch. The outer surface of the end closure plug has a taper of 0.0015 inch over a length of 0.125 inch from the outer to the inner end. A weld groove is formed in the outer surface of the outer end of the closure plug having a depth of 0.008 inch and extending 0.030 inch from the end. The closure plug is preferably inserted within the end of the tube with an interference fit of the order of 0.002 inch.

The closure plug-tube end juncture is then welded on an automatic welding machine with an 0.040 inch diameter electrode placed 0.025 inch from the end of the tube using a welding current of 30 amps. The tube is held in a revolving collet turning at 3.85 r.p.m. and the weld is completed in one revolution. Chill blocks, of known type, are provided 0.035 inch below the end of the tube and the weld is shielded by a flow of argon gas thereover at a rate of 16 cubic feet per minute.

By the use of such an end closure having a tapered outer surface and utilizing a welding groove to aid in the formation of the seal weld, it is possible to seal the end of a fuel pin with the utmost guarantee of seal integrity.

While in accordance with the provisions of the statutes we have illustrated and described herein the best forms and modes of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:
1. In a fuel pin comprising an elongated tube having an inner surface, said tube containing fissionable fuel material, an end closure for sealingly closing the end of said tube, said end closure comprising a circular cup-shaped member having an inner end of smaller diameter than the outer end to provide an inwardly tapering substantially cylindrical outer surface of extended length, said extended cylindrical outer surface being coextensive with the inner surface of the end of said tube, and means providing a welding groove at the juncture of the end of said tube and the outer end of said cup-shaped member.

2. In a fuel pin comprising an elongated tube having an inner surface, said tube containing fissionable fuel material, an end closure for sealingly closing the end of said tube, said end closure comprising a circular cup-shaped member adapted to fit in the end of said tube closed end first, said cup-shaped member having an inner end of smaller diameter than the outer end to provide an inwardly tapering substantially cylindrical outer surface of extended length, said extended cylindrical outer surface being coextensive with the inner surface of the end of said tube, and means providing a welding groove at the outer end of said cup-shaped member corresponding with the end of said tube.

3. In a fuel pin comprising an elongated tube having an inner surface, said tube containing fissionable fuel material, an end closure for sealingly closing the end of said tube, said end closure comprising a circular cup-shaped member adapted to fit in the end of said tube closed end first with the outer end of said cup-shaped member corresponding with the end of said tube, said cup-shaped member having an inner end of smaller diameter than said outer end to provide an inwardly tapering substantially cylindrical outer surface of extended length, said extended cylindrical outer surface being coextensive with the inner surface of the end of said tube, and means providing a welding groove at the outer end of said cup-shaped member corresponding with the end of said tube.

4. In a fuel pin comprising an elongated thin-walled tube having an inner surface, said tube containing fissionable fuel material, an end closure for sealingly closing the end of said tube, said end closure comprising a circular cup-shaped member adapted to fit in the end of said tube closed end first with the outer end corresponding with the end of said tube, said cup-shaped member having an outer end of such a diameter as to form a tight fit with said tube and having an inner end of smaller diameter to provide an inwardly tapering substantially cylindrical outer surface of extended length, said extended cylindrical outer surface being coextensive with the inner surface of the end of said tube, and means providing a welding groove at the outer end of said cup-shaped member corresponding with the end of said tube.

5. In a fuel pin comprising an elongated thin-walled tube having an inner surface, said tube containing fissionable fuel material, an end closure for sealingly closing the end of said tube, said end closure comprising a circular thin-walled cup-shaped member adapted to fit into the end of said tube closed end first with the outer end corresponding with the end of said tube, said cup-shaped member having an outer end of such a diameter as to form a tight fit with said tube and having an inner end of smaller diameter to provide an inwardly tapering substantially cylindrical outer surface of extended length, said extended cylindrical outer surface being coextensive with the inner surface of the end of said tube, and a peripheral groove in the outer surface of the outer end of said cup-shaped member which cooperates with the inner surface of the end of said tube to form a welding groove, and means forming a weld in said welding groove between said cup-shaped member and said tube.

References Cited by the Examiner
UNITED STATES PATENTS

| 1,223,777 | 4/17 | Eby | 189—36 |
| 2,440,999 | 5/48 | Anderson. | |
| 2,592,115 | 4/52 | Carroll. | |
| 2,983,660 | 5/61 | Loeb et al. | |
| 2,994,423 | 8/61 | Ford et al. | |

FOREIGN PATENTS 873,370  7/62  Great Britain.

CARL D. QUARFORTH, Primary Examiner.

OSCAR R. VERTIZ, REUBEN EPSTEIN, Examiners.